(12) United States Patent
Findlay et al.

(10) Patent No.: US 8,203,627 B2
(45) Date of Patent: Jun. 19, 2012

(54) COMPACT OPTICAL ZOOM

(75) Inventors: Ewan Findlay, Dollar (GB); Andrew Harvey, Glasgow (GB); Mads Demenikov, Edinburgh (GB)

(73) Assignee: STMicroelectronics (Research & Development) Ltd, Marlow, Buckinghamshire (GB)

( * ) Notice: Subject to any disclaimer, the term of this patent is extended or adjusted under 35 U.S.C. 154(b) by 375 days.

(21) Appl. No.: 12/423,739

(22) Filed: Apr. 14, 2009

(65) Prior Publication Data
US 2009/0262221 A1      Oct. 22, 2009

(30) Foreign Application Priority Data

Apr. 16, 2008   (EP) ..................................... 08275005

(51) Int. Cl.
   *H04N 5/262*   (2006.01)
(52) U.S. Cl. .................................................. 348/240.1
(58) Field of Classification Search ................ 348/240.1
   See application file for complete search history.

(56) References Cited

U.S. PATENT DOCUMENTS

| | | | | |
|---|---|---|---|---|
| 5,748,371 | A * | 5/1998 | Cathey et al. ................. | 359/558 |
| 6,911,638 | B2 * | 6/2005 | Dowski et al. ............. | 250/201.9 |
| 6,937,817 | B2 * | 8/2005 | Yasuda ........................... | 396/84 |
| 7,567,286 | B2 * | 7/2009 | Takei et al. .................... | 348/335 |
| 7,612,805 | B2 * | 11/2009 | Solomon ..................... | 348/222.1 |
| 7,859,588 | B2 * | 12/2010 | Parulski et al. .............. | 348/349 |
| 7,877,006 | B2 * | 1/2011 | Moriya ........................... | 396/147 |
| 7,899,264 | B2 * | 3/2011 | Stewart ........................ | 382/255 |
| 7,944,490 | B2 * | 5/2011 | Hayashi ........................ | 348/294 |
| 2003/0127584 | A1 | 7/2003 | Dowski et al. | |
| 2005/0204329 | A1 | 9/2005 | Pauca et al. | |
| 2005/0259889 | A1 | 11/2005 | Ferrari et al. | |
| 2006/0132639 | A1 * | 6/2006 | Page ............................. | 348/335 |
| 2007/0031136 | A1 * | 2/2007 | Kakkori ........................... | 396/89 |
| 2008/0007626 | A1 * | 1/2008 | Wernersson ............... | 348/211.9 |
| 2008/0174678 | A1 * | 7/2008 | Solomon .................. | 348/231.99 |
| 2008/0285868 | A1 | 11/2008 | Rai et al. | |
| 2009/0273667 | A1 * | 11/2009 | Nozaki et al. .................. | 348/77 |

FOREIGN PATENT DOCUMENTS

| | | |
|---|---|---|
| EP | 1 926 047 | 5/2008 |
| JP | 1191112 | 8/1989 |

OTHER PUBLICATIONS

Punchihewa. "A Random Colour Test Pattern Generator for Objective Colour Artefact Assessment in Benchmarking Colour Images Codecs," Information and Automation, ICIA, Dec. 2006, pp. 307-312.

(Continued)

*Primary Examiner* — Lin Ye
*Assistant Examiner* — Amy Hsu
(74) *Attorney, Agent, or Firm* — Gardere Wynne Sewell LLP

(57) ABSTRACT

A zoom lens system includes a variator lens group, a compensator lens group and a third lens group. The compensator lens group is arranged to only partially compensate for movement of the variator group. In order to provide further compensation for the zoom lens, an image enhancer implement wavefront coding and artifact reduction techniques. The compensator group may be fixed or alternatively, its movement relative to the variator may be effected by a simple cam mechanism.

29 Claims, 13 Drawing Sheets

OTHER PUBLICATIONS

Prasad, et al. "Pupil-phase optimization for extended-focus, aberration-corrected imaging systems," Advanced Signal Processing Algorithms, Architectures, and Implementations XIV; Edited by Luk, Franklin T., Proceedings of the SPIE, vol. 5559, 2004, pp. 335-345, XP002440110.

Prasad, et al. "Engineering the Pupil Phase to Improve Image Quality," Proceedings of SPIE vol. 5108 (2003) copyright 2003 SPIE-0277-786X/03, pp. 1-12.

Muyo, et al. "Decomposition of the optical transfer function: wavefront coding imaging systems," copyright 2005 Optical Society of America, Optics Letters, vol. 30, No. 20, Oct. 15, 2005; 0146-9592/05/202715-3, pp. 2715-2717.

Van Der Gracht, et al. "Iterative Restoration of Wavefront Coded Imagery for Focus Invariance," Date: Unknown, 7 pages.

Yamaji "Design of Zoom Lenses," Progress in Optics, vol. VI, 1967, North-Holland Publishing Company—Amsterdam, Interscience Publishers, Library of Congress Catalog Card No. 61-19297, pp. 106-170.

E.R. Dowski Jr. et al., "Extended Depth of Field Through Wave-Front Coding", Applied Optics, OSA—Optical Society of America, vol. 34, No. 11, Washington, D.C., Apr. 10, 1995, pp. 1859-1866 (8 Pages).

EP Extended Search Report, EP Serial No. 08275005, Oct. 29, 2008 (16 Pages).

Kautsky, J., "A new wavelet-based measure of image focus", Pattern Recognition Letters 23 (2002) pp. 1785-1794.

Johnstone, I. M., "Wavelet Threshold Estimators for Data with Correlated Noise", J. R. Statist. Soc. B (1997), 59, No. 2, pp. 319-351.

* cited by examiner

COMPACT OPTICAL ZOOM

PRIORITY CLAIM

The present application claims the benefit of European Application for Patent No. 08275005.0 filed Apr. 16, 2008 entitled "Compact Optical Zoom", the disclosure of which is hereby incorporated by reference to the maximum extent allowable by law.

BACKGROUND OF THE INVENTION

1. Technical Field of the Invention

The present invention relates to optical zoom systems, and in particular to optical zoom systems that are compact enough to be used on camera modules designed for mobile telephone handsets and similar devices.

2. Description of Related Art

Cameras modules for installation in mobile devices (e.g., mobile phone handsets, Portable Digital Assistants (PDAs) and laptop computers) have to be miniaturized further than those used on compact digital still cameras. They also have to meet more stringent environmental specifications and suffer from severe cost pressure. Optical zoom camera modules are in general costly, large and more delicate that their fixed focus and auto-focus counterparts. As such, optical zoom camera modules tend not be used on these kinds of mobile devices, and particularly not on the cheaper or smaller mobile devices.

A zoom lens is essentially a lens which can be changed in focal length continuously without losing focus. A standard compact zoom camera module would typically consist of three groups of lenses, two of which are able to move with respect to the other. In such a camera, the change of focal length is provided by moving the variator group (generally the middle group of lenses) and the focus is held by changing the position of the compensator group with respect to both the variator group and the image plane. As the variator group moves from the front to the back of the lens, the other moving lens (the compensator group) moves forward and then backward in a parabolic arc to keep the image focused on the image plane. In doing so, the overall angular magnification of the system varies, changing the effective focal length of the complete zoom lens.

The position of the variator with respect to the rest of the system in standard 35 mm cameras can be dictated by a mechanical cam, and in compact digital still cameras by digital control of encoded stepper motors or similar. In both these cases the positional accuracy of the compensator to the variator, and to the image plane, is critical. On miniaturization for use in mobile devices, the further cost of achieving the combined accuracy of the optics, mechanics, actuator and control loop at this scale becomes prohibitive.

It would be desirable to remove or alleviate the accuracy constraints on actuation and control and reduce the requirement for accuracy on the remaining mechanical parts. This would allow for reduction in cost and therefore allow further size reduction.

SUMMARY OF THE INVENTION

In a first aspect, there is provided a zoom lens system comprising at least three lens groups and image enhancing means. One of said lens groups comprises the variator group, which is movable so as to adjust the focal length of the system, and another of said lens groups comprises the compensator lens group, wherein said compensator lens group is arranged to only partially compensate for the movement of the variator group. The image enhancing means comprises opto-algorithmic means for extending the depth of field of the lens system.

Said opto-algorithmic means for extending the depth of field may comprise means for introducing a phase perturbation to obtain a phase-encoded image; means for recording the phase encoded image data; and means for performing a reconstruction algorithm on the recorded phase encoded image data so as to obtain an image in which the effects of the phase perturbation are removed. However, any other opto-algorithmic method may be used and, for example, the encoding need not necessarily be phase encoding, but encoding based on another parameter, for instance easily deconvolved lens aberrations.

The term "lens group" will be understood to include single lenses or groups of two or more lenses.

In one embodiment the compensator group is in a fixed position and does not move with the variator group. Alternatively the compensator group may move with said variator group via a simple mechanism. Said simple mechanism may be a mechanical cam.

Said zoom lens system may comprise a front fixed lens group which is optically negative and the variator lens group, which may be optically positive. Said means for introducing a phase perturbation may be comprised within the variator lens group. A stop may be incorporated in said variator lens group. The variator lens group may consist of a plastic lens element close to the stop allowing said means for introducing a phase perturbation to be implemented as part of that lens element. Alternatively said means for introducing a phase perturbation may be located on a plate near the stop. The variator lens group may comprise two plastic aspheric components and a glass doublet situated on either side of the stop. Said front group may comprise a single negative aspheric lens made of a low dispersion plastic.

Said compensator lens group may comprise two aspheric plastic lens elements wherein a first of these is made of a low dispersion plastic and a second is made of a high dispersion plastic.

Preferably, the means for introducing a phase perturbation is a phase mask that yields a focus invariant point-spread function. Preferably, the phase mask is a cubic or petal phase mask.

It is to be understood that the phase mask can be an infinite number of different shapes. When considering the special cases of cubic or petal phase masks as mentioned here and elsewhere in the description it is to be understood that the terms are intended to encompass deviations from the usual shapes as illustrated in the FIGURES, so long as an overall characteristic cubic or petal form is retained in a general sense. That is, changes can be made to the usual cubic and petal shapes that act only to fine tune the effects of the masks rather than to substantially alter their characteristics, and changes of this type are intended to be included in the terms "cubic" and "petal" phase masks in the context of the present description at all points.

Preferably, the step of introducing a phase perturbation comprises a wavefront coding step.

Said image enhancing means may further comprise an automatic artifact reduction mechanism. Said automatic artifact reduction mechanism may comprise means for estimating a degree of defocus in the obtained image; means for adjusting the reconstruction algorithm to take account of the estimated degree of defocus; and means for performing the adjusted reconstruction algorithm to obtain a restored image.

The means for adjusting the reconstruction algorithm may comprise: means for using a measurement of the variator position in determining the reconstruction algorithm, means for measuring an image metric of the obtained image; and means for estimating a new defocus parameter for the image reconstruction algorithm using the image metric.

Said measurement of the variator position does not need to be a precise or accurate measurement, an inaccurate or rough measurement will suffice.

The means for estimating a new defocus parameter for the image reconstruction algorithm using the image metric may comprise means for performing an iterative analysis of images reconstructed with various defocus parameters, and means for selecting the defocus parameter that optimizes the image metric for obtaining the restored image.

Preferably, the image metric is contrast.

Preferably, the degree of defocus is chosen as the value that maximizes the variance of the image contrast.

There may further be provided image segmentation means operable to obtain and then combine a restored image for each segmented image feature to form a composite restored image.

In a second aspect of the invention there is provided a mobile device comprising imaging means incorporating the zoom lens system of the first aspect of the invention.

The mobile device is preferably one of a mobile telephone, laptop computer, webcam, digital still camera or camcorder.

In an embodiment, a zoom lens system comprises: a front lens group having a fixed position; a rear lens group; and a variator lens group positioned between the front lens group and the rear lens group. The variator lens group is movable with respect to the fixed position of the front lens group. A mask is associated with the variator lens group for optically encoding an image processed by the variator lens group. An image sensor positioned behind the rear lens group generates data representative of the optically encoded image, and a digital image processor digitally decodes the optically encoded and sensed image.

BRIEF DESCRIPTION OF THE DRAWINGS

Other features and advantages will become clear in the description which follows of several non-limiting examples, with reference to the attached drawings wherein.

DETAILED DESCRIPTION OF THE DRAWINGS

Figure 1:
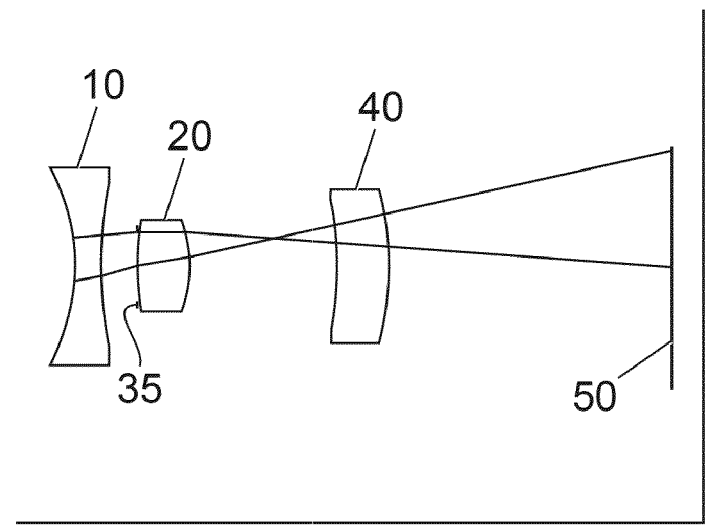
FIG. 1 shows a zoom lens arrangement in accordance with an embodiment.

FIG. 1 shows a schematic design for a zoom lens system including: a fixed front group 10 which is optically negative; an optically positive variator group 20; a stop 35, which is incorporated in the variator group; a rear group 40, which can either be positive of negative (or neither); and the image plane 50 for the device.

This arrangement allows for the making of particularly compact optical zoom cameras with only one moving element in the form of the variator group 20. The moving element group 20 performs the variator function of a standard two moving group design. The arrangement of negative-positive-neg/pos lenses is particularly suitable for compact zoom arrangements. Compensation is performed electronically by way of an image reconstruction algorithm. This may be done by the addition of a wavefront coding (WFC) mask, or other pupil phase mask, being placed in the region of the stop 35 which resides in the moving group 20. The WFC mask can be place either on a separate plate at the stop 35 or on the surface of a lens included in the group 20 nearest to the stop.

Figure 2:
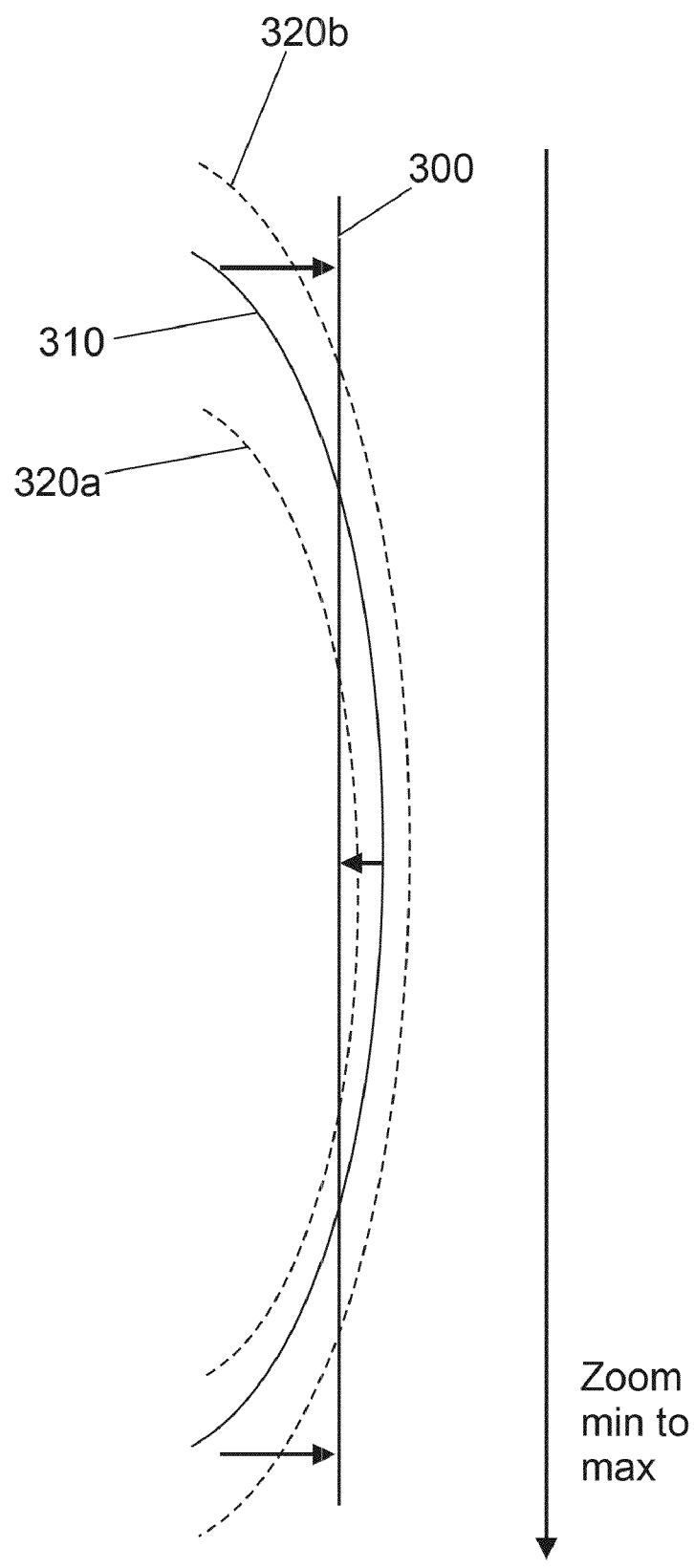
FIG. 2 is a diagram showing the effect on the focal plane of having the variator group as the only moving group.

FIG. 2 shows the result of not having a second moving lens group to focus as the variator group is moved. It shows the ideal image plane (that is the position of the digital imaging means) 300, and solid arc 310, which shows where the actual image is focused as the variator group is moved between its two extremes (min and max zoom). Either side of this solid arc is a dotted arc representing the depth of field 320a, 320b. Provided that the digital imaging means (ideal image plane 300) remains inside these dotted lines then the image will remain acceptably in focus. One way of ensuring that this is the case is by increasing the depth of field. It is also possible to apply an automatic artifact reduction mechanism to allow better focus to be obtained at all zoom positions. Application of this automatic artifact reduction mechanism essentially has the effect of moving the solid arc 310 towards the image plane 300 as shown by the arrows. Techniques to achieve both increased depth of field and better actual focus are described below.

It has been known in many different fields to phase-encode image data. One such field is the recently developed wavefront coding (WFC) technique, developed to increase the depth of field of incoherent optical systems and described in E. Dowski and T. W. Cathey, "Extended depth of field through wavefront coding," Appl. Opt. 34, 1859-1866 (1995), the disclosure of which is hereby incorporated by reference.

In this approach, pupil-plane masks are designed to alter, that is to code, the transmitted incoherent wavefront so that the point-spread function (PSF) is almost constant near the focal plane and is highly extended in comparison with the conventional Airy pattern. As a consequence the wavefront coded image is distorted and can be accurately restored with digital processing for a wide range of defocus values. By jointly optimizing the optical coding and digital decoding, it is possible to achieve tolerance to defocus which could not be attained by traditional imaging systems whilst maintaining their diffraction-limited resolution.

Figure 3:
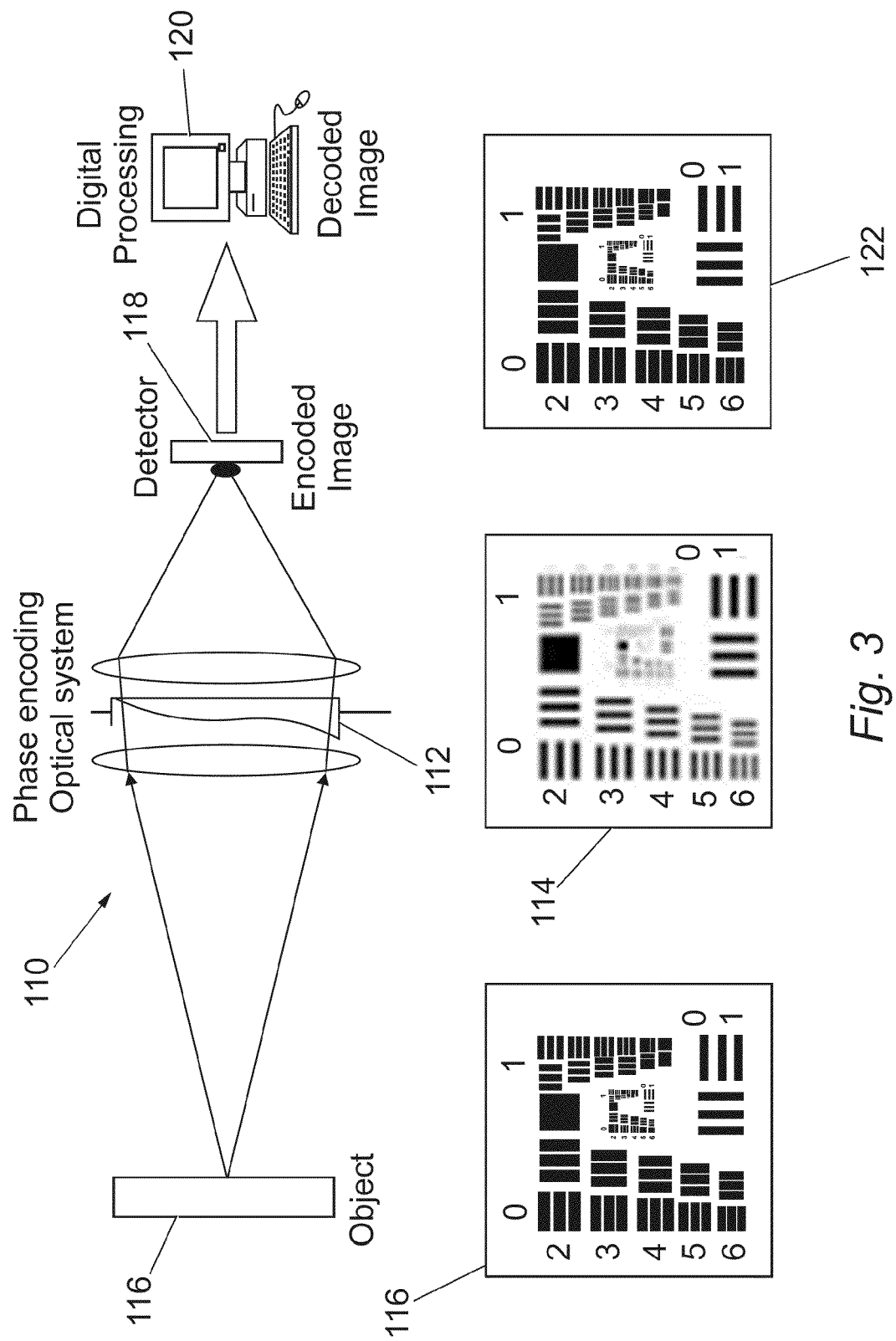
FIG. 3 shows a known phase encoding imaging system.

The phase encoding principle is illustrated in FIG. 3. An optical system 110 comprises lenses and/or other optical elements and a phase encoding means 112 which is near to or in the pupil plane that changes the phase of the radiation that is incident upon it. The phase encoding means 112 can take the form of a phase mask. Due to the phase mask, the optical system 110 produces a phase encoded image 114 of an object 116, which is detected by image sensing means 118. The phase encoded image 114 appears blurred when viewed. Processing means 120 then applies a reconstruction algorithm to remove the phase encoding to produce a restored image 122, which appears in focus, that is, sharp, when viewed. Because the variation in the point spread function is predetermined by the choice of mask, the reconstruction algorithm can be written to reverse the blurring effects of the phase encoding means 112.

Various methods have been used for the design of phase mask, for both square and circular apertures. Early design of phase masks was carried out in the frequency domain by the use of the ambiguity function (AF). The AF combined with the stationary phase approximation indicates that the ideal phase mask for extending the depth of field must be anti-symmetric and have a linear separable cubic form:

$$f(x,y)=\alpha(x^3+y^3)$$

Figure 4:
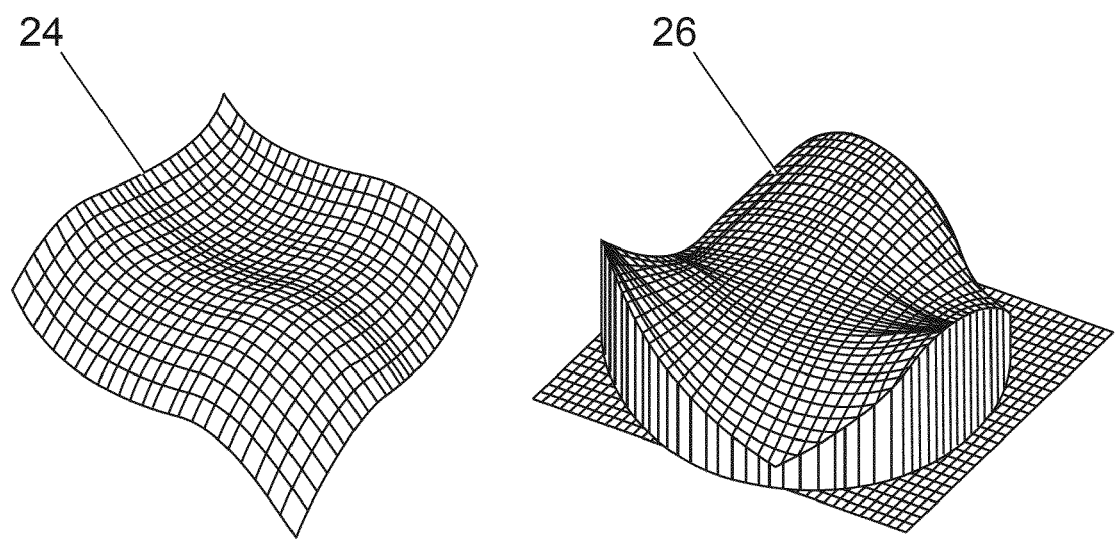
FIG. 4 shows cubic and petal phase masks for use with imaging system of FIG. 3.

A cubic phase mask 24 of this type is illustrated in FIG. 4. The strength of the phase mask, $\alpha$, sets the maximum wavefront deviation and yields the amount of defocus invariance in the decoded image.

In the last five years, pupil plane encoding has been extended to include more general phase functions; phase masks have been successfully designed in the spatial domain in which the point spread function (PSF), Strehl ratio and Fisher information metrics are solved to be invariant to defocus. A technique called Pupil Plane Engineering has been developed by Prasad et al, and is described in S. Prasad, T. Torgersen, V. P. Pauca, R. Plemmons, J. van der Gracht, "Engineering the Pupil Phase to Improve Image Quality," in Proceedings of the SPIE, Vol. 5108 Visual Information Processing XII, edited by Z. Rahman, R. Schowengrdt, and S. Reichenbach (SPIE, Wellingham, Wash., 2003), pp. 1-12, the disclosure of which is hereby incorporated by reference. This approach generalizes the shape of the mask to include higher polynomial orders and is optimized by means of Fisher information metrics. The derived PPE mask 26, see FIG. 4, has an anti-symmetric phase shape (like a petal) and is given by:

$$\theta(x,y)=\beta(x^3+y^3)+\gamma(x^2y+xy^2)$$

where $|x|<1$, $|y|<1$ are normalized co-ordinates and $\beta$ and $\gamma$ are real variables that control the optical path difference (OPD) or amount of coding introduced in the transmitted wavefront of the optical system. We will denote by $\alpha$ the OPD introduced by a phase mask. For the 2D cubic phase mask, the maximum the peak-to-valley OPD is given by $4\alpha$.

In addition, radially symmetric quartic and logarithmic phase masks, which can be manufactured using traditional techniques, also enable aberration mitigation. The performance attained by these kinds of phase mask cannot equal that of anti-symmetric masks, but are suitable under modest amounts of aberrations and can be used without digital signal processing.

Having the WFC mask, or other phase mask, at the stop allows the stop on the moving variator group to be used in conjunction with a stationary compensator group. The increase in the maximum allowed defocus $W_{20}$ for the system given by WFC allows the zoom system to function with no movement from the compensator group. This is particularly important for compressed systems (i.e. those with overall track length, including the objective lens track, of less than four times the sensor diagonal for a 3× optical zoom function with a wide horizontal field of view greater than 60° (e.g. a track of less than 20 mm for a 3× zoom ⅓" format sensor)).

The extension to the range of allowed defocus $W_{20}$ is due to the variation of f-stop (F/#) with zoom. This is accentuated by the stop being place in the moving, variator group (for a standard system the F/# range is expected to change by a factor of greater than 2 on going form wide to narrow FOV).

Note that the shift in the defocus aberration $W_{20}$ due to increase in the back focal length $\delta$ z is given by the well known equation $$\Delta W_{20} = \frac{\delta_z}{8 \cdot (F/\#)^2}$$

While the above examples describe an arrangement wherein there is no movement from the compensator group, in one possible embodiment the compensator group does move. However, the movement of the compensator group relative to the variator may, for example, be effected by a simple cam mechanism, rather than the complex arrangements required on conventional lenses to ensure the image is correctly focused. Instead, the relatively simple movement proposed serves only to keep the image within a range of de-focus, with the wavefront coding and artifact reduction techniques described herein used to compensate for the lack of accurate focus control. A main advantage of this is that such a simple cam control mechanism can be incorporated in the compressed zoom lens arrangements, which would be impossible with conventional compensator zoom control mechanisms.

The mechanical cam may consist of a single molded plastic collar with two slots which house pegs attached to the variator and compensator lens groups respectively. Actuation rotates the collar such that the pegs move with respect to each other. The relative position of the two lens groups with respect to each other will thus be controlled to approximately 10 times the tolerance required for a conventional zoom system. The position of the cam can be monitored to give a low accuracy location of the variator and thus be used to tune the WFC algorithm appropriately. The uncertainty in position results in an image blur that is compensated for by the WFC process which is tuned to the absolute position of the variator.

The advantages of this arrangement are as follows: No need to accurately control the relative positions of the compensator group with respect to the variator group; No need to have an auto-focus algorithm to drive the position of a focus group or the compensator also acting as the focus group; Note that an auto-focus algorithm of sorts may be run as part of the WFC deconvolution engine as explained below; One motor can drive the variator and compenstator in tandem with minimal feedback control; and Compressed optical track length optical zoom, which can be manufactured at easily obtained mechanical tolerances.

As mentioned previously, in addition to the wavefront coding techniques described above, the post processing deconvolution kernel may be changed on the basis of an automatic artifact reduction mechanism to allow better focus to be obtained at all zoom positions.

FIG. 4 shows that both the cubic and PPE phase masks are anti-symmetric. The OTF of such optical systems is complex and varies significantly with the defocus parameter $W_{20}$. In the case of rotationally symmetric phase masks the OTF are always real. The inventors have realized that the main cause of the image artifacts in a reconstructed phase encoded image is the discrepancy between the phase of the coding OTF and the phase of the decoding filter.

Figure 5A:
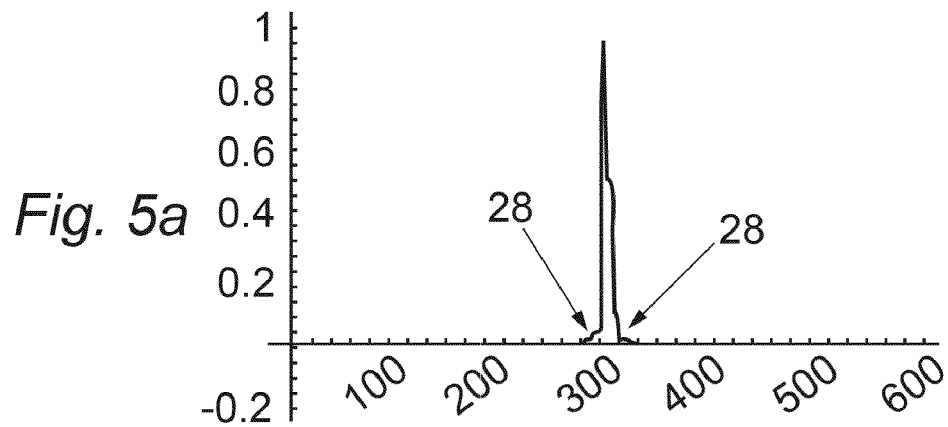
FIGS. 5a-5c show the variation with defocus of the point spread function of the imaging system of FIG. 3 used with the cubic phase mask of FIG. 4, that is subsequent to deconvolution using the in-focus PSF.
Figure 5B:
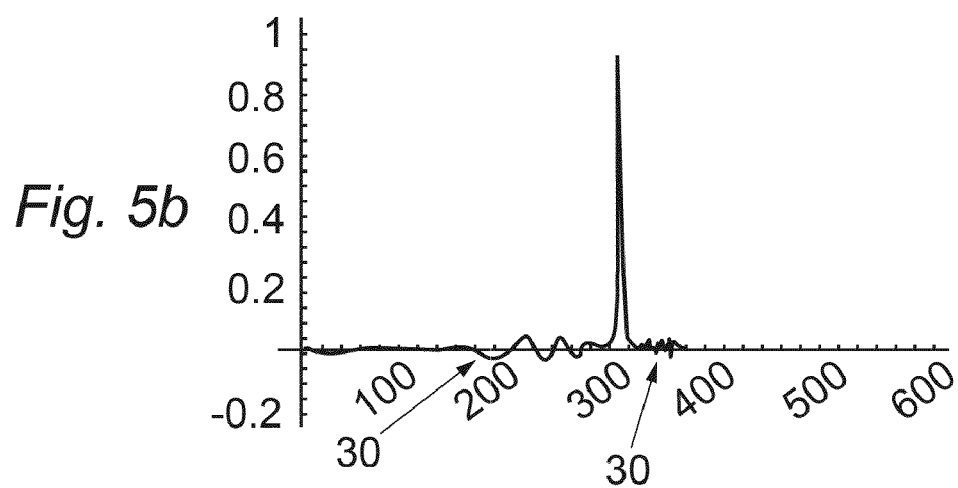
Figure 5C:
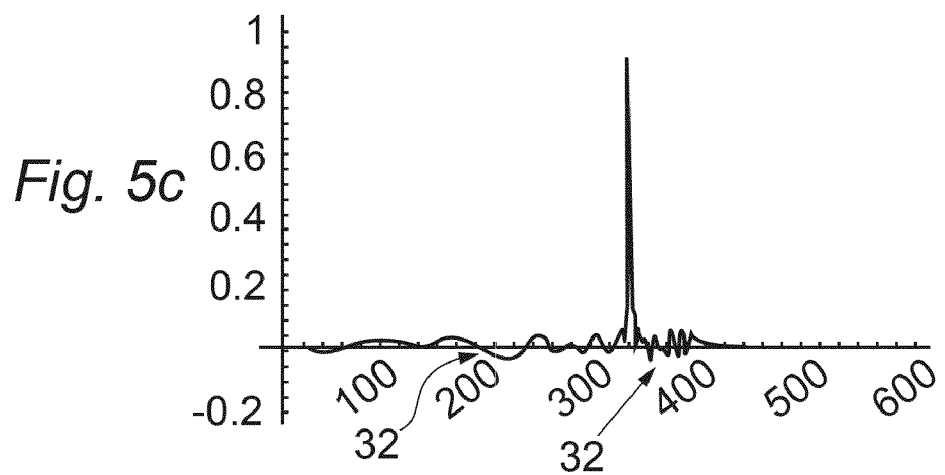

FIGS. 5a-5c show the PSF after restoration (with a signal magnitude in arbitrary units plotted on the y-axis versus spatial position on the x-axis) of a hybrid optical/digital system including a cubic phase mask for various values of defocus, assuming a phase mask strength of 5λ. FIG. 5a shows the PSF for zero defocus ($W_{20}=0\lambda$), in which it can be seen that the point remains well defined, having the characteristics $\text{Sinc}^2$ form of a uniformly illuminated aperture. FIG. 5b shows the PSF for a mild defocus ($W_{20}=\lambda$), where the phase variation of the OTF has resulted in sidelobe levels of increased magnitude and extent and FIG. 5c shows the PSF for a severe defocus ($W_{20}=2\lambda$) with further increased sidelobe effects at low spatial frequencies 32.

Figure 6:
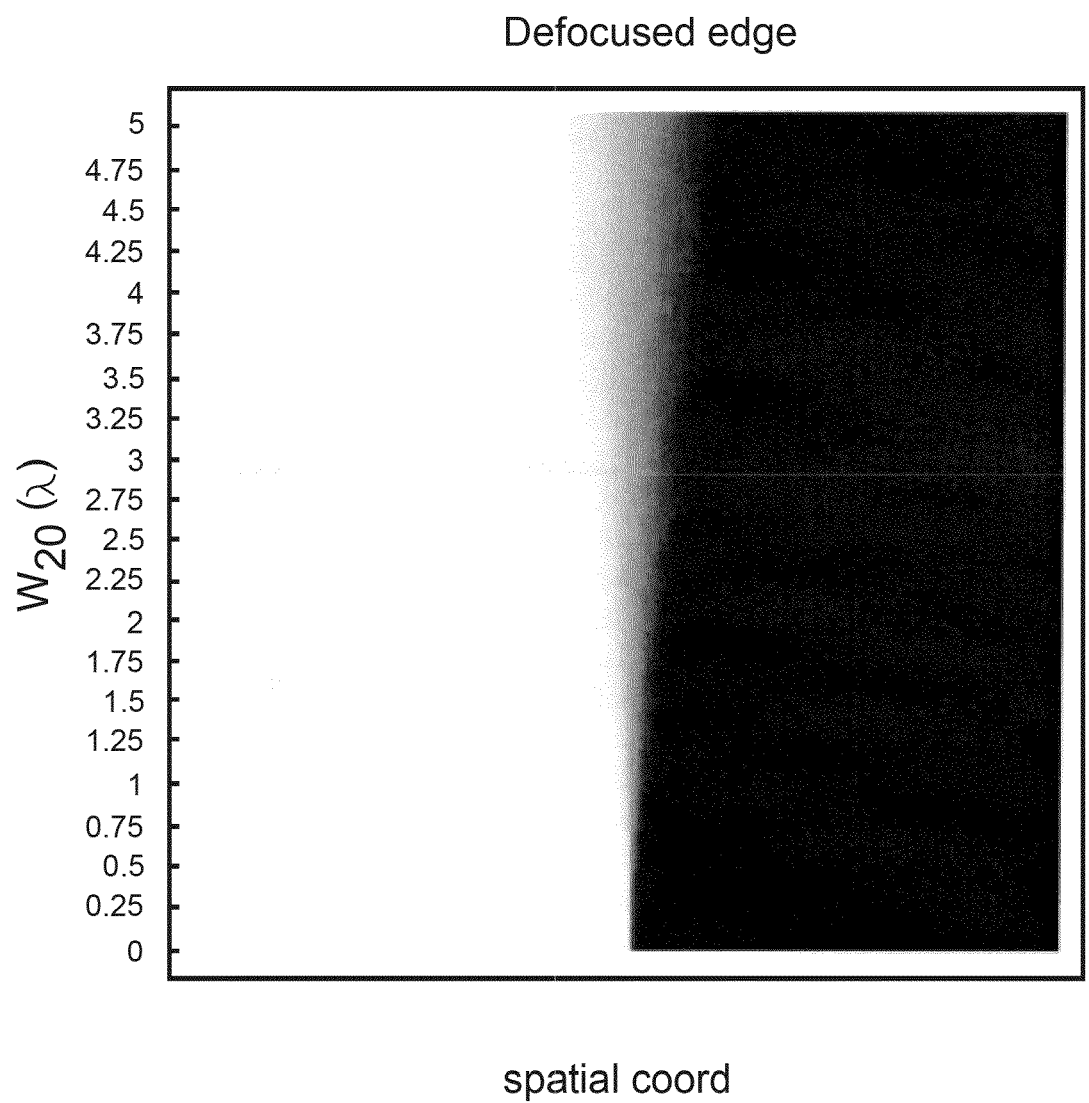
FIG. 6 shows a line-transfer function of a conventional optical system as a function of a defocus parameter $W_{20}$.

This variation of PSF with defocus is responsible for varying artifacts in the restored images depending on the defocus of the object. FIG. 6 shows how an edge is imaged with a conventional optical system for different values of defocus, plotted against the y-axis. It can be seen that the boundary between the light and dark regions is sharp at $W_{20}=0$, but that it gets progressively more blurred as $W_{20}$ increases.

Figure 7:
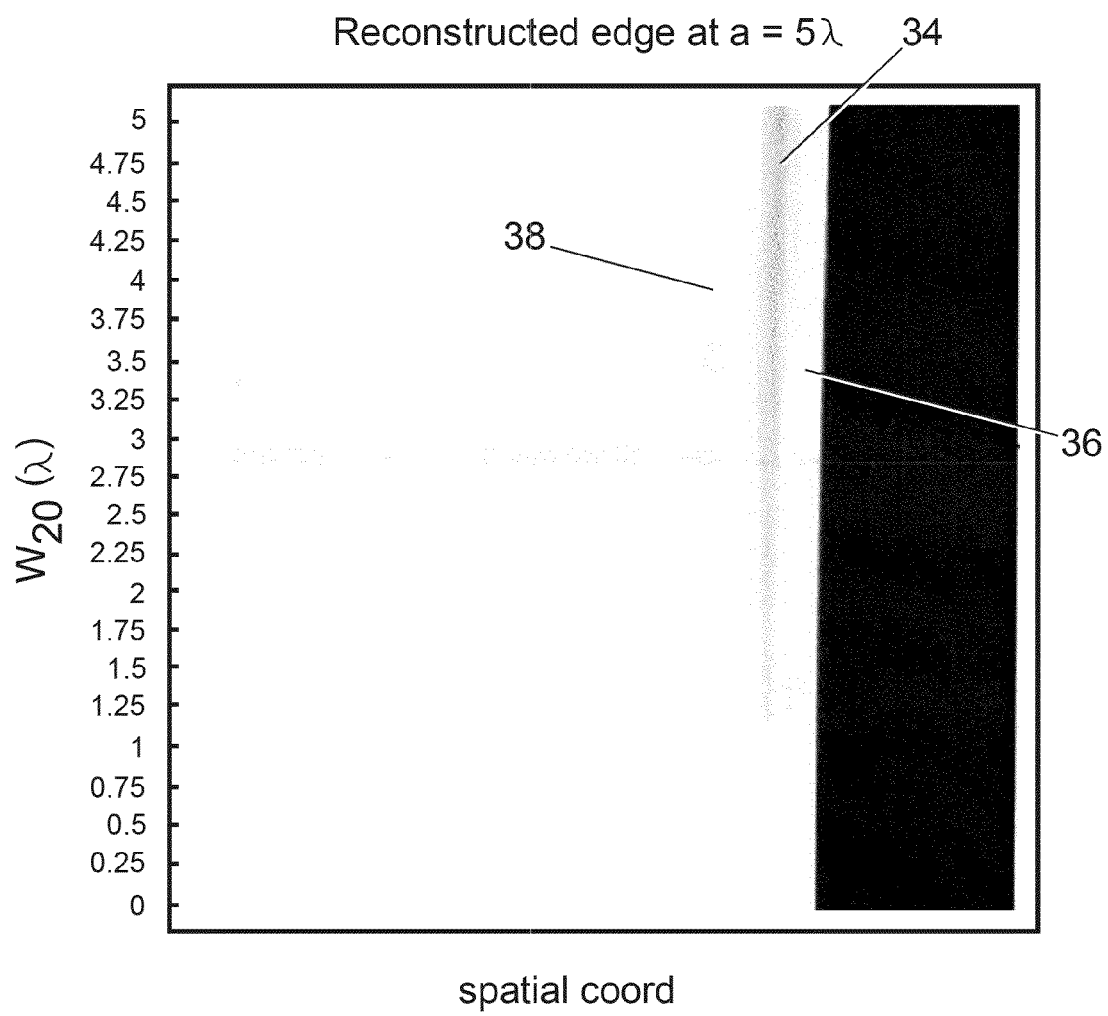
FIG. 7 shows a line-transfer function as a function of a defocus $W_{20}$ for the imaging system of FIG. 3.

FIG. 7 illustrates how the same edge is imaged with a wavefront coded imaging system. It can be seen that the boundary between the light and dark regions is much sharper through the range of defocus values, as expected. However, FIG. 7 also shows that there are restoration artifacts, in the form of ripples 34, 36, 38, that vary with the defocus parameter $W_{20}$. Therefore, one can interpret the artifacts in the restored image as a defocus signature.

Figure 8:
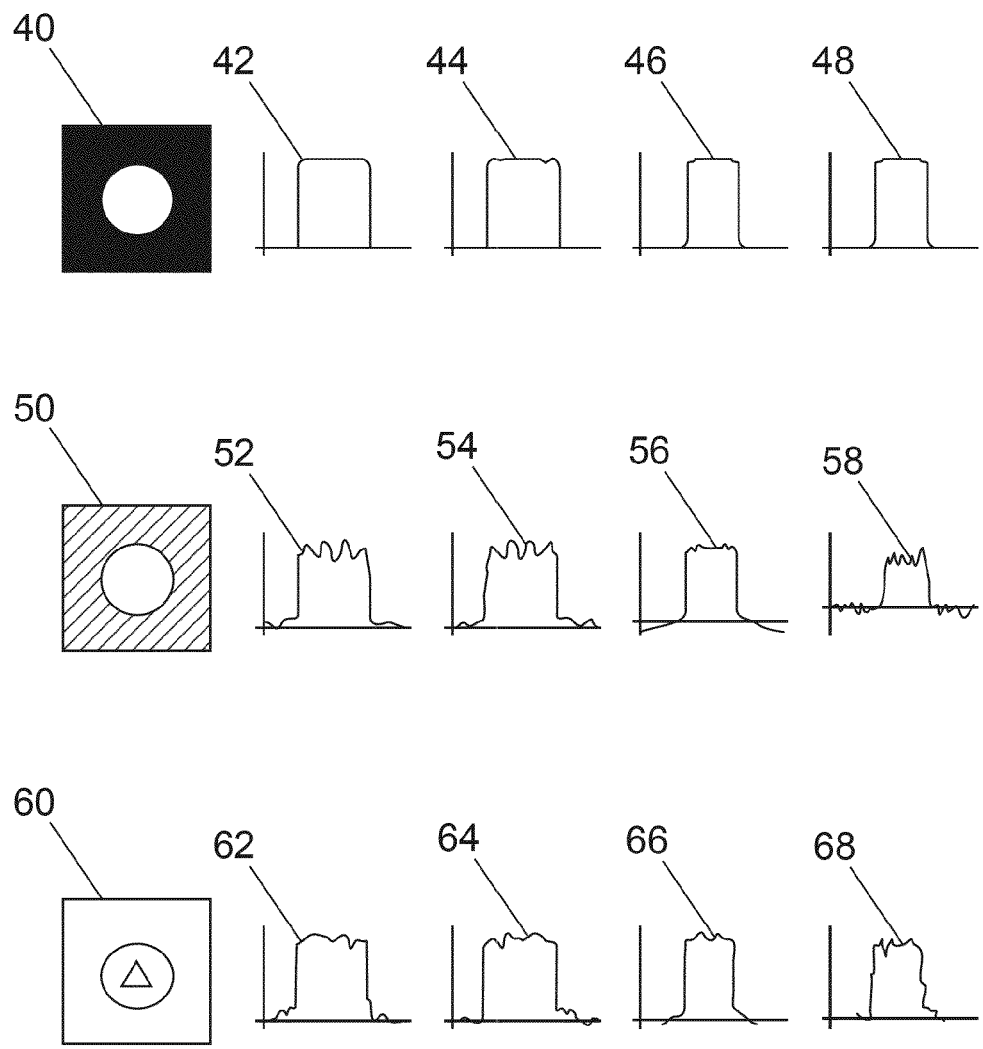
FIG. 8 shows restoration artifacts after deconvolution of a high contrast circular target with cubic and petal phase masks.

This is illustrated again in FIG. 8, in which the strength of the phase mask is again assumed to be $\alpha=5\lambda$. The top row shows a high contrast circular target 40, together with various sections through the target at zero misfocus, including a horizontal section 42 taken along a horizontal axis, a vertical section 44 taken along a vertical axis, a first diagonal section 46 taken along a diagonal running from the bottom left corner to the top right corner, and a second diagonal section 48 taken along a diagonal running from the top left corner to the bottom right corner, where each of the above axes and diagonals are the lines passing through the centre of the target 40 as illustrated. The middle row illustrates the blurred image 50 formed with a cubic phase mask, of the type illustrated in FIG. 4 that introduces a defocus of 4λ, and the sections 52-58 of the reconstructed image, along the same respective axes or diagonals as the sections 42-48 illustrated directly above them. The bottom row illustrates the blurred image 60 formed with a petal phase mask with the same peak-to-valley OPD as the cubic phase mask, of the type illustrated in FIG. 4 that introduces a defocus of 4λ, and the section 62-68 of the reconstructed image, along the same respective axes or diagonals as the section 42-48 as illustrated above them in the top row. The artifacts in the sections 52-58 and 62-68 can be seen as the variations from the ideal sections 42-48, and as discussed, these artifacts arise from the phase and amplitude disparities between the optical convolution and digital deconvolution kernels.

Such artifacts may be mitigated if the restoration algorithm kernel matched the PSF exactly. In essence the artifact is a manifestation of the phase mismatch between the actual PSF and that expected by the decoding kernel. The phase mismatch is a result of the defocus of the camera system, which may be dependent on the position of the object with respect to the focused distance of the camera in object space. The decoding kernel may be set for any defocus value if the PSF at that defocus is known. Thus if the phase mismatch is estimated from the artifact seen for a nominal defocus an alternative kernel can be employed that matched the defocus of the image and nullify the artifact.

One can then remove the artifacts present in the restored image of an object that originally has a defocus $W_{20}$, by deducing the optical convolution kernel and then decoding the detected image with the appropriate digital kernel. Thus, removing the artifacts becomes a matter of estimating the defocus present in the image. This estimation can be achieved iteratively with various restoration kernels based on a given metric of the degree of artifacts present in the recovered image. The artifact removal becomes an optimization problem for the given metric. One possible metric is the image contrast, which will be described in more detail below. Others include but are not limited to sharpness, entropy, energy. The principle for all of these is iterative optimization of the metric with defocus as the free variable.

Image segmentation can also be used to deal with images that comprise several features (or objects) with different degrees of defocus. Image segmentation algorithms are well known per se, and so will not be described in detail herein. In the case of a segmented image, the iterative restoration is applied to each segmented feature or object separately.

Figure 9:
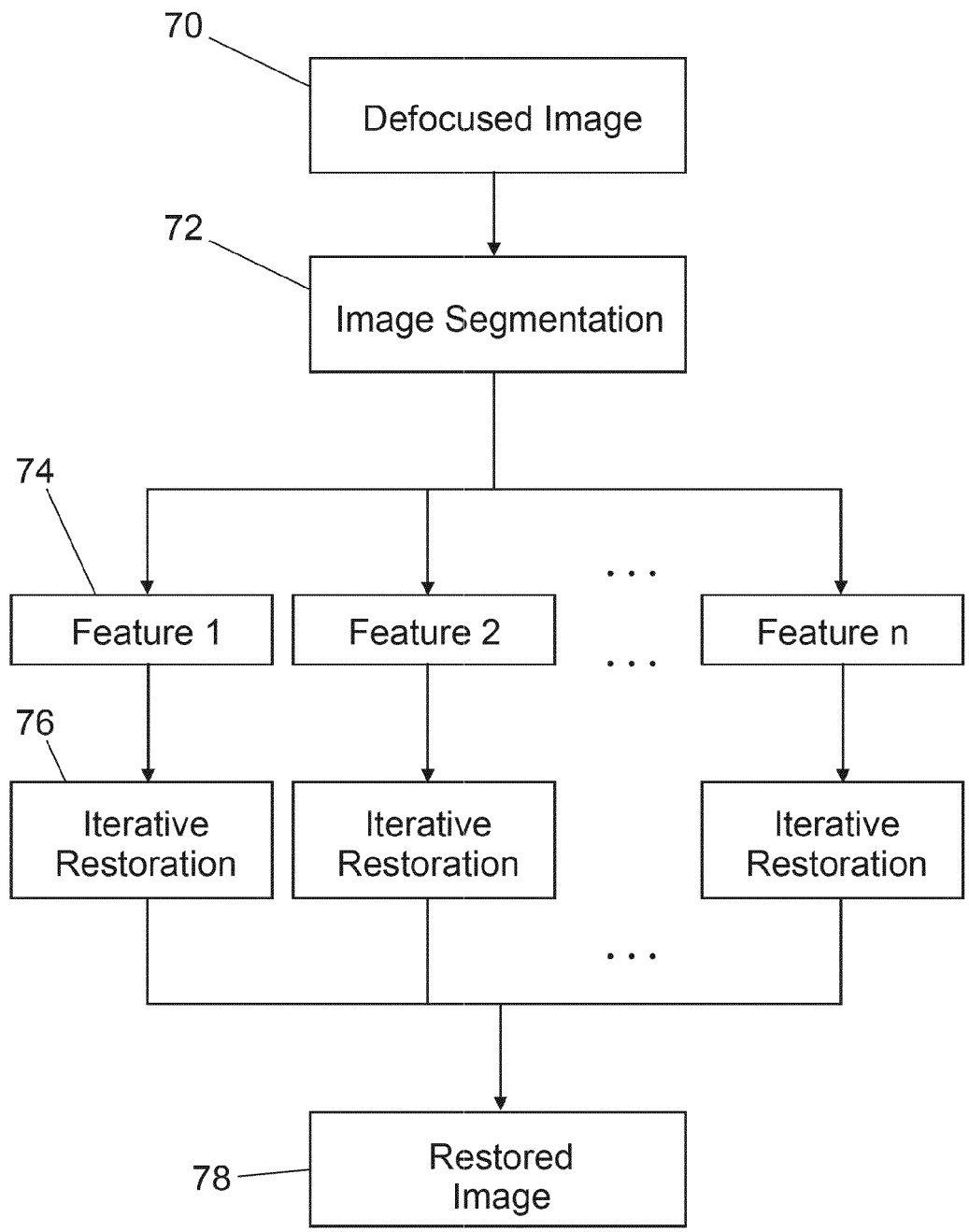
FIG. 9 illustrates an image restoration process suitable for use in an embodiment.
Figure 10A:
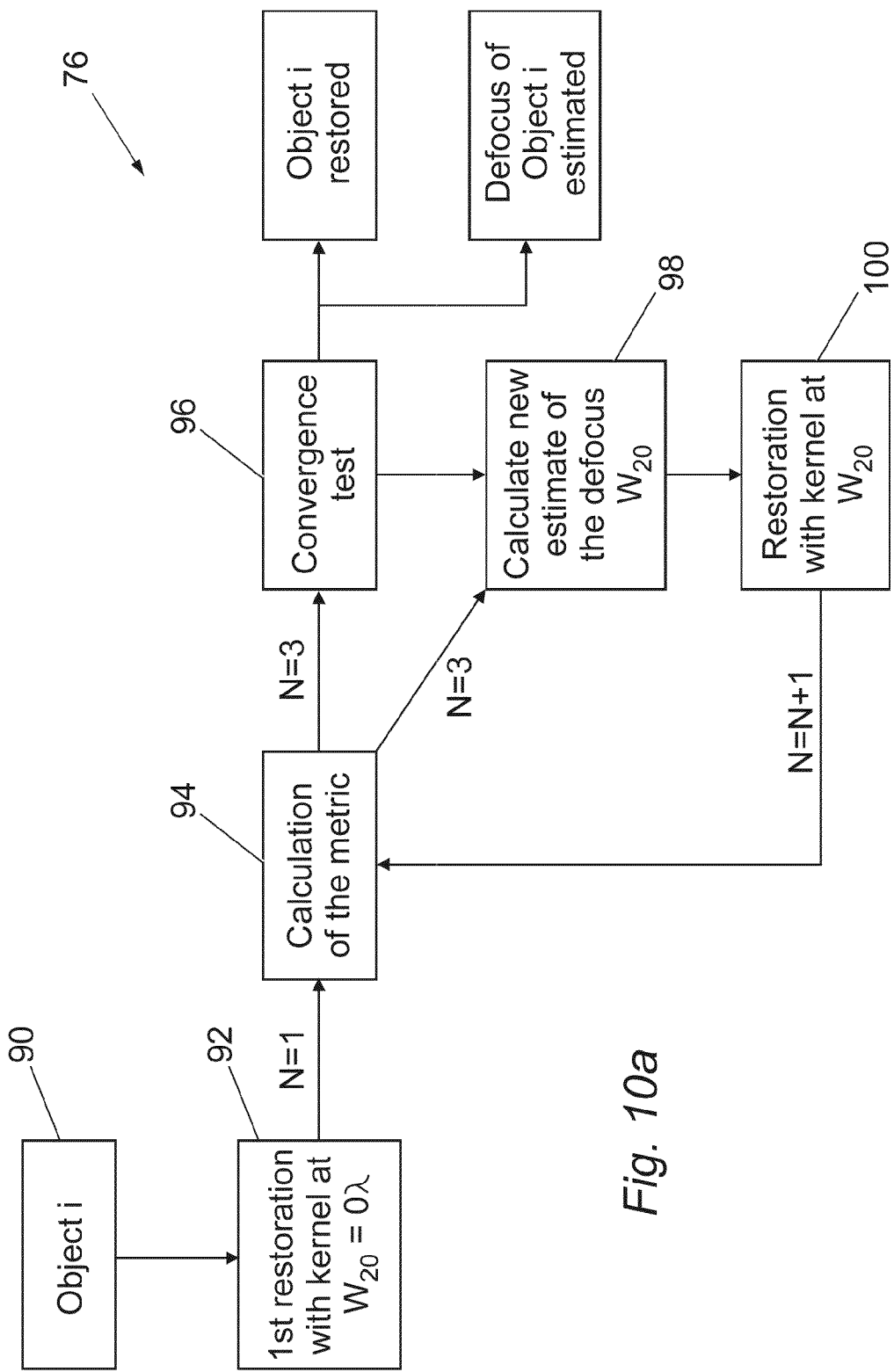
FIGS. 10a and 10b illustrate the iterative restoration step of FIG. 9.
Figure 10B:
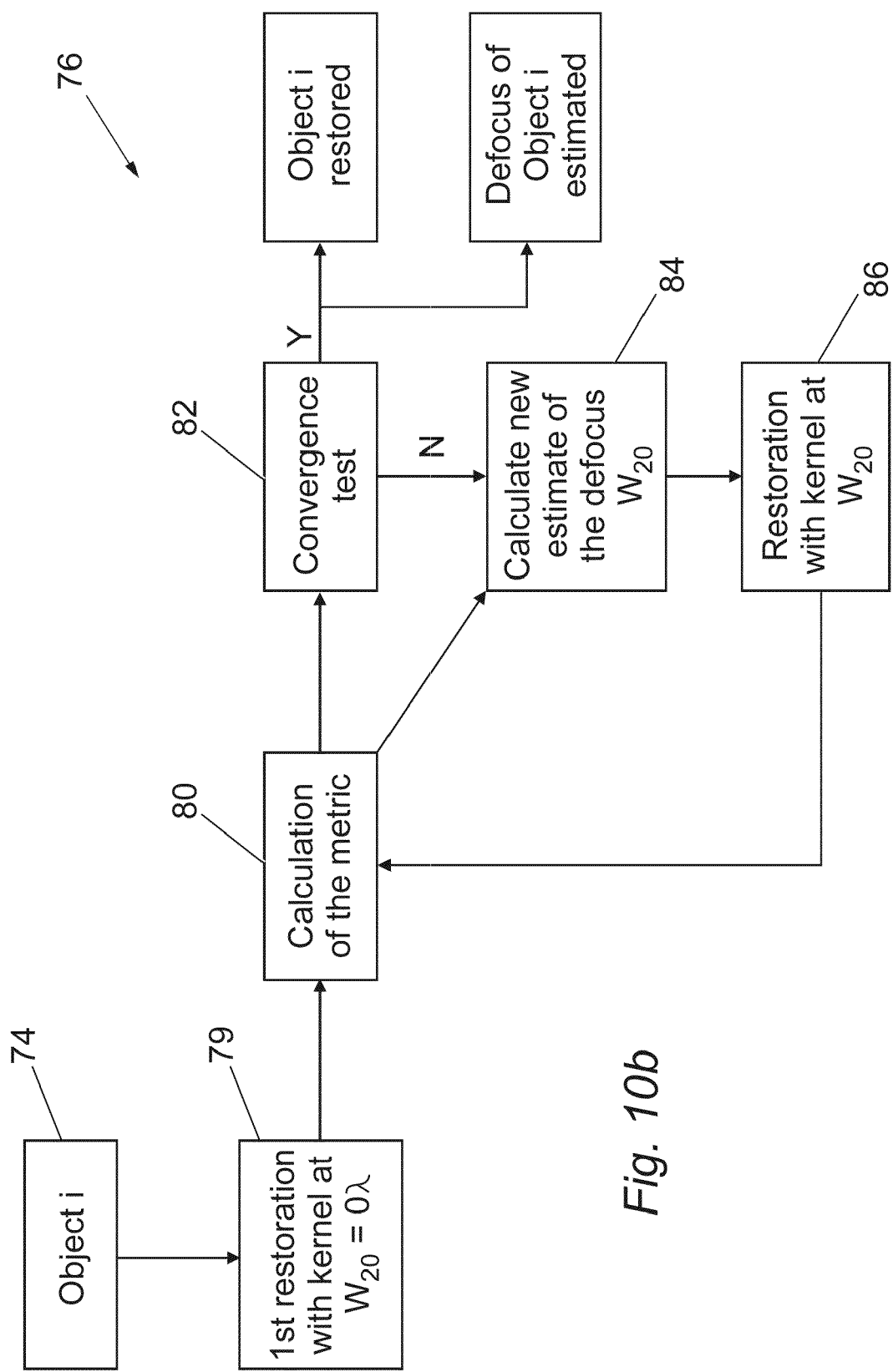

The restoration algorithm follows the process depicted in FIGS. 9 and 10a-10b. A defocused image 70 corresponds to the phase encoded (blurred) image 14 of the standard set up illustrated in FIG. 1. The defocused image 70 is operated on by an image segmentation algorithm 72 which detects and defines a plurality of features 74 within the image. Each of the objects 74 is then operated on by an iterative restoration process 76 before being combined to form a new restored image 78. It will be appreciated that the image segmentation step 72 is optional, and in the event of its omission the defocused image 70 would be directly operated on by the iterative restoration process 74 to render the new restored image 78.

Examples of the operation of the iterative restoration process 76 are shown in FIGS. 10a and 10b.

As shown in FIG. 10a, after object i 90 is obtained, a first restoration 92 is carried out with a kernel at $W_{20}=0$. The image metric is then calculated (94) a number of times before a convergence test is carried out (96) to determine for which value of $W_{20}$ the image metric is optimized. In the embodiment of FIG. 10a, convergence depends on the turning point in a plot of a graph of the metric against $W_{20}$, and so the metric must be measured for at least three values of $W_{20}$ before convergence can be assumed. Thus at the first calculation of the metric (94) a counter is set to zero, and a new estimate of the defocus parameter is calculated for the first given value of $W_{20}$. A restoration 100 is then carried out with the new kernel, and the counter is incremented so that the metric can be recalculated (94). This cycle repeats until the counter reaches a predetermined limit (which can in one example be three passes), and once the limit is reached a convergence test 96 is carried out which selects the appropriate deconvolution kernel and yields a restored object together with an estimated defocus.

A second alternative example of the iterative restoration process 76 is shown in FIG. 10b. After object i 74 is obtained, a first restoration 79 is carried out with a kernel at $W_{20}=0$. The image metric is then calculated (80) and then a convergence test is carried out 82 to determine if the image metric is optimized, that is, whether the metric is within a predetermined level of a predetermined threshold. If the convergence test 82 yields a positive result (Y), the object i 74 is restored and an estimation of the defocus is achieved. If the convergence test 82 yields a negative result (N), a new estimate of the defocus parameter $W_{20}$ is calculated, 84, which is then used to modify the kernel of the restoration algorithm, 86. This loop is repeated until the convergence test 82 yields a positive result.

Figure 11:
FIG. 11 shows restored images of a first reference image for various deconvolution kernels.
Figure 11:
Figure 11:
Figure 11:
Figure 11:
Figure 12:
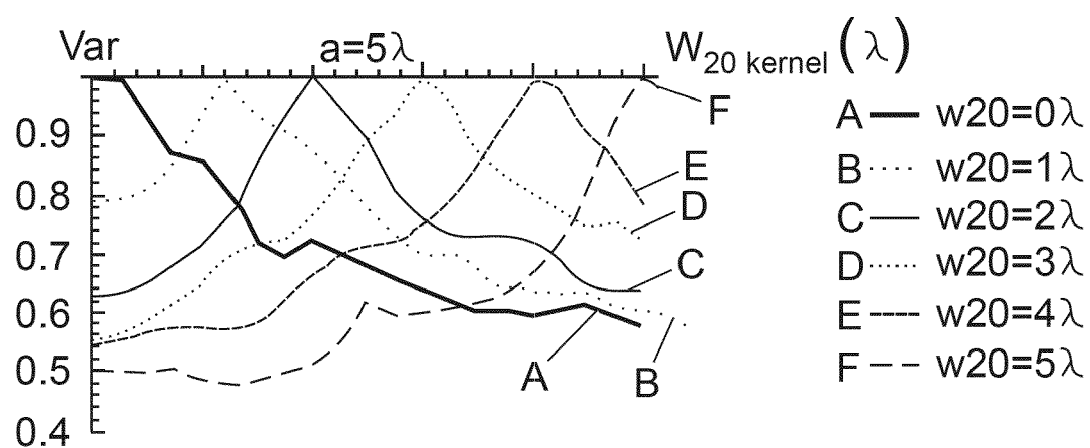
FIG. 12 shows the variance of the restored images of FIG. 11 as a function of a defocus parameter.

As mentioned above, one possible metric is the image contrast. One way of measuring the image contrast comprises resealing the restored image between 0 and 1, and then calculating its variance. This metric takes advantage of the contrast loss in the restored and resealed image due to the artifacts. It is maximized when the coding and decoding kernels are the same, i.e. when the effective optical transfer function inferred from the restored image features corresponds to that which would be achieved by an in-focus system in the absence of phase coding. This defocus estimation technique has been tested on several reference images. FIG. 11 shows this with respect to the well known Lena image, for a coding kernel having a defocus parameter of $W_{20}=3\lambda$, and where deconvolution kernels corresponding to $W_{20}$ of 0 to $5\lambda$ are shown, in order from left to right and top to bottom in FIG. 11. It can be appreciated that the restored image is free of defocus artifacts when the coding and decoding kernels are equal, and that the variance is maximized in this case, see FIG. 12, which shows the variance of the restored (and resealed) image of Lena as a function of the defocus parameter $W_{20\ kernel}$ used in the deconvolution kernels. Phase encoding performed by a square aperture cubic phase mask with $\alpha=5\lambda$. The original defocus differs for each curve and goes from $W_{20}=0\lambda$ to $W_{20}=5\lambda$. Note the variance is maximized in each case when $W_{20\ kernel}=W_{20}$.

Figure 13:
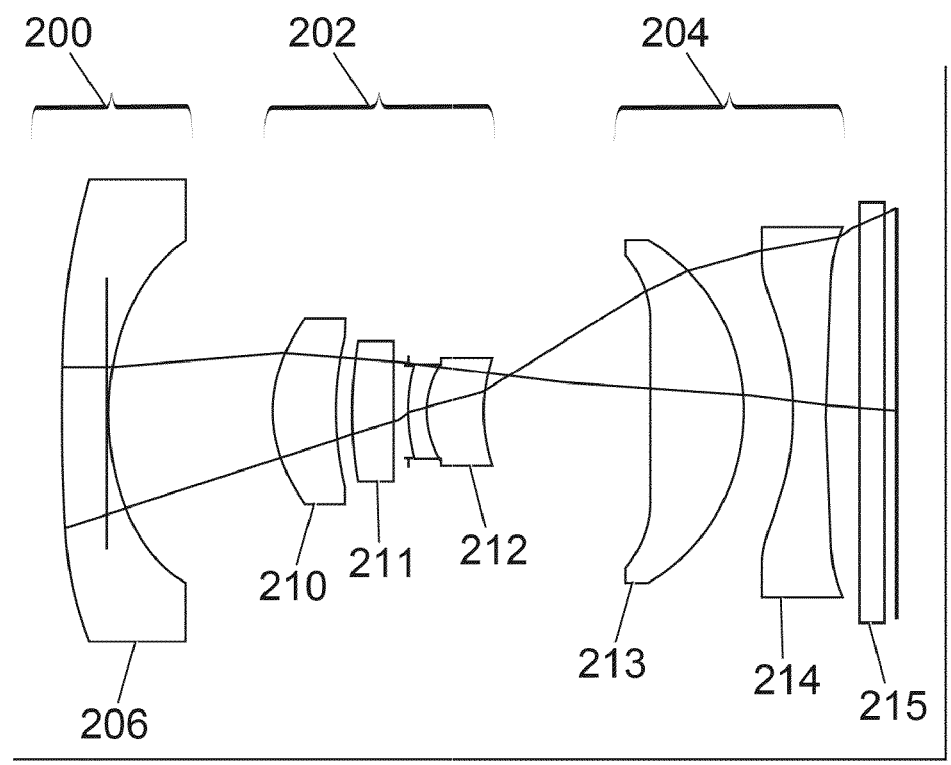
FIG. 13 shows a zoom lens arrangement according to a further embodiment.

FIG. 13 shows an embodiment of the invention where one of the elements adjacent to the stop is made of plastic allowing the imposition of the WFC mask (or other phase mask) on the rear surface of the plastic element 210 which is adjacent to the stop. This is essentially the best location for the phase mask. The front group 200 consists of a single negative aspheric lens made of a low dispersion plastic (COC or COP). The second group 202 consists of two plastic aspheric components 206, 210 and a glass doublet 212, situated on either side of the stop 211. Note the proximity of the rear surface of plastic element 210 to the stop 211 facilitates the imposition of the WFC or other pupil phase mask. This second group acts as the variator for the zoom system. Group three 204 consists of two aspheric plastic elements 213 and 214. To provide a degree of control over chromatic and other aberrations in this compressed system the first of these is made of a low dispersion plastic (COP or COC) and the second is a high dispersion plastic. A cover glass 215 intervenes between the lens and the sensor.

Various improvements and modifications can be made to the above without departing from the scope of the invention.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A zoom lens system, comprising:
   at least three lens groups; and
   an image enhancer,
   wherein a variator lens group of said three lens groups is movable so as to adjust a focal length of the system, and
   wherein a compensator lens group of said three lens groups is arranged to only partially compensate for movement of the variator lens group,
   said image enhancer comprising an opto-algorithmic processing configured to extend a depth of field of the system, and
   an automatic artefact reduction mechanism configured to: estimate a degree of defocus in the obtained image; adjust a reconstruction algorithm to take account of the estimated degree of defocus; and execute the adjusted reconstruction algorithm to obtain a restored image.

2. The zoom lens system as claimed in claim 1 wherein said opto-algorithmic processing for extending the depth of field is configured to: introduce a perturbation to obtain an encoded image; record the encoded image data; and perform a reconstruction algorithm on the recorded encoded image data so as to obtain an image in which the effects of the perturbation are removed.

3. The zoom lens system as claimed in claim 2 wherein introducing a perturbation comprises introducing a phase perturbation to obtain a phase-encoded image.

4. The zoom lens system as claimed in claim 3 wherein introducing a phase perturbation is accomplished with a phase mask that yields a focus invariant point-spread function.

5. The zoom lens system as claimed in claim 4 wherein the phase mask is a cubic or petal phase mask.

6. The zoom lens system as claimed in claim 3 wherein introducing a phase perturbation comprises performing wavefront coding.

7. The zoom lens system as claimed in claim 2 wherein introducing a perturbation comprises introducing the perturbation within the variator lens group.

8. The zoom lens system as claimed in claim 2 further comprising a stop incorporated in said variator lens group.

9. The zoom lens system as claimed in claim 8 wherein the variator lens group comprises a plastic lens element close to the stop allowing said introducing of a phase perturbation to be implemented as part of that plastic lens element.

10. The zoom lens system as claimed in claim 8 wherein said introducing a phase perturbation comprises structure located on a plate near the stop.

11. The zoom lens system as claimed in claim 1 wherein the compensator lens group is fixed in position and does not move with the variator lens group.

12. The zoom lens system as claimed in claim 1 wherein the compensator lens group moves with movement of said variator lens group via a mechanism.

13. The zoom lens system as claimed in claim 12 wherein said mechanism is a cam mechanism.

14. The zoom lens system as claimed in claim 13 wherein said cam mechanism comprises a collar and two actuation means, one each for actuating said variator lens group and said compensator lens group.

15. The zoom lens system as claimed in claim 1 wherein said system comprises a front fixed lens group which is optically negative, and wherein the variator lens group is optically positive.

16. The zoom lens system as claimed in claim 1 wherein said compensator lens group comprises two aspheric plastic lens elements and wherein a first of these plastic lens elements is made of a low dispersion plastic and a second of these plastic lens elements is made of a high dispersion plastic.

17. The zoom lens system as claimed in claim 1 wherein adjusting the reconstruction algorithm comprises:
   using a measurement of the variator position in determining the reconstruction algorithm,
   measuring an image metric of the obtained image; and
   estimating a new defocus parameter for the image reconstruction algorithm using the image metric.

18. The zoom lens system as claimed in claim 17 wherein estimating a new defocus parameter for the image reconstruction algorithm using the image metric comprises performing an iterative analysis of images reconstructed with various defocus parameters, and selecting the defocus parameter that optimizes the image metric for obtaining the restored image.

19. The zoom lens system as claimed in claim 18 wherein the image metric is contrast.

20. The zoom lens system as claimed in claim 19 wherein a degree of defocus is chosen as the value that maximizes the variance of the image contrast.

21. The zoom lens system as claimed in claim 19 further comprising performing image segmentation to obtain and then combine a restored image for each segmented image feature to form a composite restored image.

22. The zoom lens system as claimed in claim 1 wherein the system is incorporated in a mobile device.

23. The zoom lens system as claimed in claim 22 wherein the mobile device is a device selected from a group consisting of a mobile telephone, laptop computer, webcam, digital still camera or camcorder.

24. A zoom lens system comprising:
at least three lens groups; and
an image enhancer,
wherein a variator lens group of said three lens groups is movable so as to adjust a focal length of the system, and
wherein a compensator lens group of said three lens groups is arranged to only partially compensate for movement of the variator lens group,
said image enhancer comprising an opto-algorithmic processing for extending a depth of field of the system,
wherein said opto-algorithmic processing for extending the depth of field is configured to: introduce a perturbation to obtain an encoded image; record the encoded image data; and perform a reconstruction algorithm on the recorded encoded image data so as to obtain an image in which the effects of the perturbation are removed,
a stop incorporated in said variator lens group,
wherein the variator lens group comprises a plastic lens element close to the stop allowing said introducing of a phase perturbation to be implemented as part of that plastic lens element, and
wherein the variator lens group comprises two plastic aspheric components and a glass doublet situated on either side of the stop.

25. A zoom lens system, comprising:
a front lens group having a fixed position;
a rear lens group;
a variator lens group positioned between the front lens group and the rear lens group, the variator lens group being movable with respect to the fixed position of the front lens group, said variator lens group comprising an aspheric lens component and a doublet lens component with a stop positioned between the aspheric component and doublet lens component;
a mask positioned adjacent a rear surface of the aspheric lens component of the variator lens group configured to optically encode an image processed by the variator lens group;
an image sensor positioned behind the rear lens group configured to generate data representative of the optically encoded image; and
a digital image processor configured to digitally decode the optically encoded and sensed image.

26. The system of claim 25 wherein the mask for optically encoding introduces a phase perturbation in the image.

27. The system of claim 25 wherein the rear lens is also movable with respect to the fixed position of the front lens group.

28. The system of claim 25 further comprising an image enhancer comprising an opto-algorithmic processing configured to extend a depth of field of the system, wherein said image enhancer further comprises an automatic artefact reduction mechanism configured to: estimate a degree of defocus in the obtained image; adjust a reconstruction algorithm to take account of the estimated degree of defocus; and execute the adjusted reconstruction algorithm to obtain a restored image.

29. A zoom lens system, comprising:
a front lens group having a fixed position;
a rear lens group;
a variator lens group positioned between the front lens group and the rear lens group, the variator lens group being movable with respect to the fixed position of the front lens group;
a mask associated with the variator lens group configured to optically encode an image processed by the variator lens group;
an image sensor positioned behind the rear lens group configured to generate data representative of the optically encoded image; and
a digital image processor configured to digitally decode the optically encoded and sensed image and including an automatic artefact reduction operation configured to: estimate a degree of defocus in the obtained image; adjust a reconstruction algorithm to take account of the estimated degree of defocus; and execute the adjusted reconstruction algorithm to obtain a restored image.

* * * * *